United States Patent [19]
Hanniala et al.

[11] Patent Number: 5,492,554
[45] Date of Patent: Feb. 20, 1996

[54] METHOD FOR PRODUCING HIGH-GRADE NICKEL MATTE FROM AT LEAST PARTLY PYROMETALLURGICALLY REFINED NICKEL-BEARING RAW MATERIALS

[75] Inventors: Pekka Hanniala; Risto Saarinen; Olli Saarinen, all of Espoo, Finland

[73] Assignee: Outokumpu Engineering Contractors Oy, Espoo, Finland

[21] Appl. No.: 350,663

[22] Filed: Dec. 7, 1994

[30] Foreign Application Priority Data

Dec. 10, 1993 [FI] Finland .................................... 935539

[51] Int. Cl.$^6$ ........................................................ C22B 3/04
[52] U.S. Cl. ........................ 75/10.35; 75/10.62; 75/425; 75/743
[58] Field of Search ................................ 75/10.35, 425, 75/743, 10.62

[56] References Cited

U.S. PATENT DOCUMENTS

| | | | |
|---|---|---|---|
| 5,332,414 | 7/1994 | Makinen | 75/10.1 |
| 5,385,600 | 1/1995 | Jounela | 75/743 |

*Primary Examiner*—Melvyn Andrews
*Attorney, Agent, or Firm*—Brooks Haidt Haffner & Delahunty

[57] ABSTRACT

The invention relates to a method for producing high-grade nickel matte and slag in a combination of a suspension smelting furnace and some other furnace without charge-type converting, so that at least part of the concentrate and/or ore fed into the process is first refined pyrometallurgically into nickel matte, which then is fed into the suspension smelting furnace, where the high-grade nickel matte proper is produced.

16 Claims, 1 Drawing Sheet

METHOD FOR PRODUCING HIGH-GRADE NICKEL MATTE FROM AT LEAST PARTLY PYROMETALLURGICALLY REFINED NICKEL-BEARING RAW MATERIALS

The present invention relates to a method for producing high-grade nickel matte and slag in a combination of a suspension smelting furnace and some other pyrometallurgical furnace, without a separate charge-type converting, so that at least part of the concentrate and/or ore fed into the process is first pyrometallurgically refined into nickel matte, which is then fed into a suspension smelting furnace, where the high-grade nickel matte proper is produced.

The direct pyrometallurgical production of metallic nickel is not advantageous owing among other things to the high melting temperature of metallic nickel, and thus to the high process temperature, which should be required. Therefore the production of nickel of sulfidic raw materials is based at least on two stages where the first produces high-grade nickel matte, which then is hydrometallurgically processed into metallic nickel.

In conventional fashion, high-grade nickel matte can be produced of sulfidic raw materials by roasting the sulfidic feed at least partly for instance in a fluidized bed reactor, and by smelting the obtained roast in an electric furnace into nickel matte. The sulfidic raw material can also be fed into the electric furnace without roasting. From the electric furnace, the obtained nickel matte is further converted for instance in a Pierce-Smith type converter into high-grade nickel matte, which is further processed hydrometallurgically into metallic nickel. A drawback of this method is the large amount of gases created at the process stage, which gases contain sulfur compounds released at different process stages, which must be cleaned prior to discharging into open air in order to avoid sulfur emissions. Owing to the weak sulfur content and large volume of the gases, their processing to for instance sulfuric acid requires remarkable investments in a gas processing plant, for instance an acid plant.

In the method based on conventional suspension smelting technology, high-grade nickel matte is made of sulfidic concentrates by smelting dried nickel concentrate in a suspension smelting furnace into nickel matte, which is further converted into high-grade nickel matte for instance in a Pierce-Smith type converter. The slags produced both in the suspension smelting furnace and in the Pierce-Smith converter are cleaned in an electric furnace, and the produced nickel-bearing matte is returned to the converter as feed. A weakness of the method is the charge-type converting stage; the volume of the gas flow and the sulfur dioxide content coming from the converting stage vary, and therefore the capacity of the acid plant required for treating the gases must be remarkably higher than when treating gases which are produced at a regular rate as a function of time The above described method based on suspension smelting is further developed in the methods specified in Australian patent No. 623 969 and U.S. Pat. No. 5,338,414. According to these methods, a high-grade nickel matte that is suited to a hydrometallurgic nickel process and has a low iron content is produced directly in a suspension smelting furnace without a separate converting step, so that the sulfur dioxide released in the smelting is conducted to the acid plant as an even gas flow with a high sulfur dioxide content. Owing to the high degree of oxidation, the slag formed in the suspension smelting furnace has a high nickel content, wherefore the slag is separately processed in an electric furnace in order to recover the nickel as metallized matte. According to one method, the metallized matte is at least partly returned to the suspension smelting furnace either in molten or solid form, and according to the other method, the matte is directly processed in a hydrometallurgic process into metallic nickel.

In the method introduced in U.S. Pat. No. 5,338,414, the metallized matte produced in an electric furnace still contains essentially more iron than high-grade nickel matte produced in a suspension smelting furnace, i.e. a flash smelting furnace. Therefore the hydrometallurgic treatment of metallized nickel matte produced in an electric furnace must, at least in the beginning of the process, be carried out separately from the treatment of high-grade nickel matte produced in flash smelting.

The methods according to the above described Australian patent No. 623 969 and U.S. Pat. No. 5,338,414 are well suited to sulfidic concentrates made of certain types of nickel ores. However, the range of applicability of the said methods is limited with respect to for instance the iron oxide/magnesia content of the concentrate, so that a concentrate with a low Fe/MgO ratio is not suitable, at least on the whole, to be treated by the said methods, because the slag formed in smelting would not have suitable properties. By employing the method of the present invention, the selection of raw materials suited for suspension smelting can be extended, so that also concentrates with a low Fe/MgO ratio can be treated in a suspension smelting—electric furnace process into high-grade nickel matte. Instead of an electric furnace, it is possible, when necessary, to use some other pyrometallurgic furnace, such as a second suspension smelting furnace. In the method of the invention, all nickel is recovered essentially from the high-grade nickel matte produced in a flash smelting furnace, and this also simplifies the hydrometallurgic step following the pyrometallurgic treatment as compared to the above described method, because separate steps for treating metallized nickel matte are not needed anymore.

When applying the high-grade nickel matte production method of the present invention to either an existing or a new production plant, there are achieved similar advantages as for the process and equipment as in the methods of the Australian patent No. 623 969 and U.S. Pat. No. 5,338,414 without essentially expanding the equipment needed for treating process gases. At the same time, the pyrometallurgic production of high-grade nickel matte with a high total yield of nickel is made possible also of such raw materials which, at least partly, could previously be treated in a separate hydrometallurgic process only, or which must have been treated by methods with a higher energy consumption than that of the method of the present invention, and where the formed amounts of gases have required a sulfuric acid plant with a remarkably higher capacity in order to clean the gases. Another advantage of the method of the invention is, that the process produces only one quality of high-grade nickel matte going to the hydrometallurgic process, in which case there is needed only one hydrometallurgic process system for the further processing of the matte into metal, without any separate extraction steps for various different nickel raw materials.

BRIEF DESCRIPTION OF THE DRAWINGS

The invention is explained in more detail with reference to the appended schematical drawing 1, which illustrates an application of the method of the invention.

DETAILED DESCRIPTION OF PREFERRED EMBODIMENTS

Figure 1:
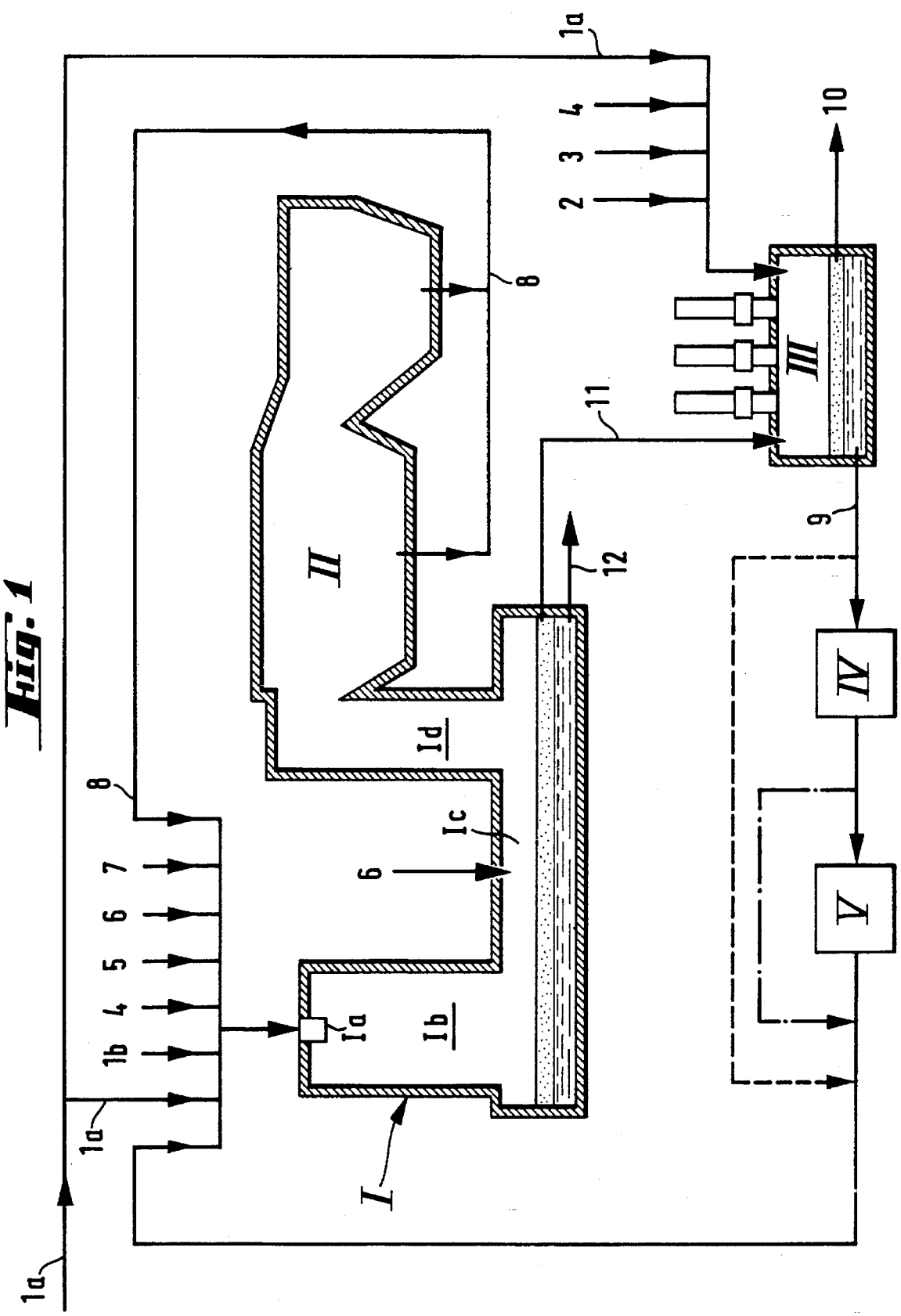

An apparatus for realizing the method of the invention advantageously comprises a flash smelting furnace I and an electric furnace III. The most essential parts of the flash smelting furnace are a concentrate burner Ia, a reaction shaft Ib, a settler Ic and an uptake shaft Id. A gas cooler II is connected to the uptake shaft. In addition to this, the apparatus includes a melt granulation unit IV for at least part of the matte, and a grinding unit V.

In the method of the invention, the nickel sulfide concentrate 1a is refined pyrometallurgically for instance in the electric furnace III. Instead of the electric furnace, there can also be used some other suitable pyrometallurgic furnace, for instance a second flash smelting furnace. The concentrate 1a is fed into the electric furnace either as pellets or as powder. For the pyrometallurgic refining, into the electric furnace there can also be fed some other nickel-bearing concentrate, nickel-bearing metallurgic slag or other advantageously coarse nickel raw materials, such as lump ore or revert 2. Suitable reverts include nickel-bearing converter flue dust, flash smelting furnace settler dust and matte and slag skulls that are ground up. Moreover, when necessary there is fed into the electric furnace some reductant 3, for instance coke, as well as flux 4 in order to adjust the properties of the slag. In addition to this, in the same electric furnace there is advantageously treated the slag 11 from the flash smelting furnace in order to recover precious metals.

The concentrate smelted in the electric furnace process and the valuable metals of the slag form on the furnace bottom nickel matte 9, which has a higher iron content than high-grade nickel matte. The valuable metal content of the slag 10 formed in the electric furnace is so low that it need not be processed further, but can be destroyed. The small amount of dust formed in the electric furnace is separately filtered of the electric furnace gases, which are united to the gas flow from the flash smelting furnace (not illustrated in the drawing). The combined gas mixture has a suitable sulfur dioxide content for producing sulfuric acid. The dusts from the electric furnace are returned to the electric furnace feed, or fed together with the flue dusts 8 from the flash smelting furnace to the flash smelting furnace.

The metallized nickel matte 9 formed in the electric furnace is granulated. Part of the metallized nickel matte can also be fed into the flash smelting furnace in molten form. In order to achieve a grain size distribution suitable for flash smelting, the finely divided nickel matte from granulation is ground, when necessary, either partly or wholly and dried prior to feeding into the flash smelting furnace.

For adjusting the slag quality, into the flash smelting furnace there is fed flux 4, such as silicates. There is also fed oxygen-enriched air 5 and a required amount of additional fuel 6. The employed extra fuel can be both solid fuel (for instance coke or anthracite) and liquid fuel (for instance oil) or gaseous fuel (for instance natural gas). In order to adjust the quality of the high-grade nickel matte 12 formed in the flash smelting furnace, there can, if necessary, be fed other nickel-bearing raw materials apart from metallized matte, such as part of the concentrate 1a to be processed or some other concentrate 1b, and various different nickel-bearing precipitates 7 from a hydrometallurgic nickel process. Also the dusts 8 formed in the flash smelting process are fed back into flash smelting. In the settler, there is burnt a small amount of fuel 6 required by the thermal balance of the settler.

The materials to be processed are fed into the flash smelting furnace either through the concentrate burner Ia, or part can be conducted directly to the settler. In the reaction shaft Ib of the flash smelting furnace, the feed materials react with each other, so that part of the sulfur reacts with the oxygen of the oxygen-enriched air to form sulfur dioxide. As a result from these reactions, owing to the released thermal energy and burning of the extra fuel, the solid materials melt mainly in the reaction shaft Ib. The molten particles are separated from the gas flow in the settler Ic and form a melt on the bottom thereof. The chemical reactions between the different feed materials continue partly in the molten phase, and from the molten phase there are separated two phases with different specific weights, so that on the bottom of the molten bath, there is formed a layer of high-grade nickel matte 12, and the topmost layer of the molten bath is formed of highly oxidized slag, which mainly contains the iron that was present in the nickel matte.

The gases from the flash smelting furnace are cooled in the gas cooler II, and the flue dust 8 obtained along with the gases is recovered; this flue dust 8 is then returned to the feed. The cooled gases are further conducted into gas processing in order to recover sulfur dioxide. The high-grade nickel matte 12 tapped from the flash smelting furnace goes to hydrometallurgic treatment in order to produce metallic nickel. The slag 11 from the flash smelting furnace is treated in the electric furnace in the fashion described above in order to recover valuable metals. If the employed pyrometallurgic furnce in the first step was for instance another flash smelting furnace instead of an electric furnace, the slag obtained from the flash smelting furnace that was used for producing high-grade nickel matte is, however, conducted to a separate pyrometallurgic furnace treatment, for instance to an electric furnace. Advantageously this treatment is carried out together with the slag used in producing nickel matte and coming from the flash smelting furnace.

The method of the invention is further illustrated by way of the following examples.

EXAMPLE 1

Nickel concentrate R1 is treated together with slag and lump ore from a flash smelting furnace, used in the production of high-grade nickel matte. Their compositions are:

|  | Ni % by weight | S % b/w | Fe % b/w | MgO % b/w |
| --- | --- | --- | --- | --- |
| Concentrate R1 | 5.8 | 16.3 | 25.4 | 14.6 |
| Slag | 2.2 | 0.3 | 40.0 | 4.0 |
| Lump ore | 2.4 | 23.5 | 40.5 | 2.7 |

Slag is fed 1.42 t and lump ore 0.6 t per ton of nickel concentrate R1. Moreover, there is fed 0.03 t high-grade nickel matte revert per ton of nickel concentrate, a required amount of flux and recirculation dust from the electric furnace. From the electric furnace, there is obtained waste slag with a low valuable metal content and nickel matte with following contents:

|  | Ni % b/w | S % b/w | Fe % b/w | MgO % b/w |
| --- | --- | --- | --- | --- |
| Slag | 0.12 | 0.8 | 25.5 | 9.05 |
| Nickel matte | 11.9 | 27.3 | 47.6 |  |

The quantity of produced nickel matte is 0.96 t per ton of nickel concentrate R1.

The nickel matte produced in an electric furnace is smelted in a flash smelting furnace together with nickel concentrates R1 and R2. The contents of concentrate R2 are given below, the contents of R1 are as above.

|  | Ni % b/w | S % b/w | Fe % b/w | MgO % b/w |
|---|---|---|---|---|
| Nickel concentration R2 | 4.7 | 18.1 | 27.5 | 11.4 |

The quantity of concentrate R1 is 0.12 t and the quantity of concentrate R2 is 0.23 t per ton of nickel matte. In addition to this, there is fed a required amount of silicate flux, a small amount of recirculated flue dust, the required extra fuel and air, with an oxygen enrichment of 85%. The formed amount of slag per ton of nickel matte is 1.48 t, and its composition is as follows:

|  | Ni % b/w | S % b/w | Fe % b/w | MgO % b/w |
|---|---|---|---|---|
| Slag from flash smelting furnace | 2.2 | 0.3 | 40.0 | 4.0 |

The whole quantity of slag is treated in the electric furnace in the above described fashion.

Owing to the high degree of oxygen enrichment, the sulfur dioxide content of the formed gas is high, about 35% $SO_2$. Into the gas coming from the flash smelting furnace, there is mixed the gas coming from the electric furnace. The sulpur dioxide content of the gas obtained is still sufficiently high for producing sulfuric acid from the gas. The product obtained from the flash smelting furnace is a high-grade nickel matte with a quantity of 0.23 t per supplied ton of nickel matte, which means that roughly 72% of the nickel fed into the flash smelting furnace is recovered directly in the high-grade nickel matte. In the above described case, the total nickel yield is 96.6%. The composition of the high-grade nickel matte is given below.

|  | Ni % b/w | Fe % b/w |
|---|---|---|
| High-grade nickel matte | 45.9 | 3.7 |

It is pointed out that the said result is obtained at a lower temperature and with fewer process steps than with the methods of the prior art.

We claim:

1. A method for producing high-grade nickel matte from a raw material containing nickel sulfide concentrate comprising the steps of:
   (a) refining at least part of the raw material in a pyrometallurgic furnace (III) in the presence of flux to produce nickel matte;
   (b) feeding the nickel matte produced in step (a), together with flux, flue dust, additional fuel and oxygen-enriched air as feed materials into a suspension smelting furnace (I);
   (c) treating the feed materials fed into the suspension smelting furnace in step (b) in the suspension smelting furnace to form high-grade nickel matte and slag;
   (d) conducting the high-grade nickel matte formed in step (c) to a hydrometallurgic treatment process; and
   (e) processing slag formed in step (c) in a pyrometallurgic furnace in order to recover metals therefrom.

2. The method of claim 1 including heating the pyrometallurgical furnace (III) electrically.

3. The method of claim 1 including refining the starting material in the pyrometallurgic furnace (III) together with slag formed in step (c).

4. The method of claim 3 including heating the pyrometallurgic furnace (III) electrically.

5. The method of claim 1 including operating the pyrometallurgic furnace (III) of step (a) as a flash smelting furnace.

6. The method of claim 1 wherein the raw material consists essentially of nickel sulfide concentrate.

7. The method of claim 1 wherein the raw material comprises nickel sulfide concentrate and other nickel-bearing material.

8. The method of claim 7 wherein the other nickel-bearing raw material is lump nickel ore.

9. The method of claim 8 wherein the other nickel-bearing raw material is a revert.

10. The method of claim 7 wherein the other nickel-bearing raw material is a metallurgic slag.

11. The method of claim 1 including feeding nickel sulfide concentrate into the suspension smelting furnace (I).

12. The method of claim 1 comprising feeding nickel-bearing raw material into the suspension smelting furnace (I).

13. The method of claim 1 comprising feeding nickel-bearing slag into the suspension smelting furnace (I).

14. The method of claim 1 including feeding the nickel sulfide concentrate into the pyrometallurgic furnace (III) in pellet form.

15. The method of claim 1 including operating both the pyrometallurgic furnace and the suspension smelting furnace as flash smelting furnaces.

16. The method of claim 15 including obtaining slag from both furnaces operating as flash smelting furnaces and treating the slag obtained in a pyrometallurgic furnace.

* * * * *